US012775246B2

(12) United States Patent
Stehlin

(10) Patent No.: US 12,775,246 B2
(45) Date of Patent: Oct. 27, 2026

(54) WATCH COMPRISING A FLANGE PROVIDED WITH A TOUCH CONTROL CIRCUIT

(71) Applicant: ETA SA MANUFACTURE HORLOGÈRE SUISSE, Grenchen (CH)

(72) Inventor: Xavier Stehlin, Cudrefin (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 443 days.

(21) Appl. No.: 17/972,989

(22) Filed: Oct. 25, 2022

(65) Prior Publication Data

US 2023/0195048 A1 Jun. 22, 2023

(30) Foreign Application Priority Data

Dec. 17, 2021 (EP) .................................... 21215634

(51) Int. Cl.
*G04G 21/08* (2010.01)
*G06F 3/0488* (2022.01)

(52) U.S. Cl.
CPC ........... *G04G 21/08* (2013.01); *G06F 3/0488* (2013.01)

(58) Field of Classification Search
CPC ................................ G04R 60/08; G04G 21/08
See application file for complete search history.

(56) References Cited

U.S. PATENT DOCUMENTS

| | | | | |
|---|---|---|---|---|
| 5,798,984 | A * | 8/1998 | Koch | G04G 21/04 343/718 |
| 2011/0298670 | A1 | 12/2011 | Jung et al. | |
| 2018/0088724 | A1 | 3/2018 | Erentok et al. | |
| 2018/0219279 | A1* | 8/2018 | Beaucourt | H01Q 1/38 |
| 2019/0379105 | A1* | 12/2019 | Sayem | H01Q 1/273 |
| 2022/0171345 | A1* | 6/2022 | Randjelovic | G04G 21/04 |

FOREIGN PATENT DOCUMENTS

| | | | |
|---|---|---|---|
| CN | 218886428 | U | 4/2023 |
| JP | 6959232 | B2 | 11/2021 |
| KR | 10-2018-0103969 | A | 9/2018 |
| WO | 2019/135856 | A1 | 7/2019 |

OTHER PUBLICATIONS

European Search Report for EP 21 21 5634 dated May 23, 2022.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

An electronic watch (1) including a case provided with a bezel (2) forming totally or partially a touch interface of said watch (1), the bezel (2) including an antenna circuit (10) of a communication module (6) of the watch (1) and a flange provided with a touch control circuit (13) of a touch control organ (8) of the watch (1).

12 Claims, 3 Drawing Sheets

WATCH COMPRISING A FLANGE PROVIDED WITH A TOUCH CONTROL CIRCUIT

CROSS REFERENCE TO RELATED APPLICATION

This application claims priority to European Patent Application No. 21215634.3 filed Dec. 17, 2021, the entire contents of which are incorporated herein by reference.

TECHNICAL FIELD OF THE INVENTION

The invention relates to a watch comprising a flange provided with a touch control circuit, said watch including an antenna circuit of a communication module of said watch.

TECHNOLOGICAL BACKGROUND

It is known in the prior art many portable electronic objects likely to be connected to communication networks such as electronic watches that are provided with touch interfaces conventionally arranged in the crystals of the latter. Such touch interfaces are generally used to improve the interactivity of watches and to simplify the manipulations thereof in particular when the latter propose a consequent number of menus or functions.

In order to be able to connect to communication networks such as Bluetooth-type networks or also in relation to the geolocation, such electronic watches comprise communication functions conventionally integrating an antenna. It is known that the optimum size of such an antenna directly depends on the wavelength of the signal emitted/received. Indeed, an antenna of optimum length makes it possible to send/receive an entire signal and at full power.

In these watches, as the space available is limited, an antenna must have a design adapted to be integrated into the case of the watch. In addition, if the watch integrates a radio communication means that operates on radio frequencies (such as 2.4 GHz or 1.5 GHz), the size of the product becomes critical in relation to the wavelength (120 mm and 200 mm).

Moreover, other constraints must also be taken into account due to the fact that these watches include a lot of metallic parts and that an antenna must be isolated therefrom.

In this context, it is understood that there is a need to find a solution, particularly that does not have the drawbacks of the prior art.

SUMMARY OF THE INVENTION

One of the aims of the invention is to have a watch comprising a touch interface and integrating an antenna circuit having an optimum length to send/receive an entire signal and at full power and coming to be integrated into the case of this watch the receiving volume of which is limited.

Another aim of the invention is to obtain a watch the aesthetics, energy consumption and manufacturing costs of which are not impacted or impacted little by the integration of a touch interface into a flange of this watch in particular of an antenna circuit.

Another aim of the invention is to obtain a watch the aesthetics, energy consumption and manufacturing costs of which are not impacted or impacted little by the integration of a touch control circuit and of an antenna circuit into a flange of this watch.

In this aim, the invention relates to an electronic watch comprising a case provided with a bezel forming totally or partially a touch interface of said watch, said bezel comprising an antenna circuit of a communication module of the watch and a flange provided with a touch control circuit of a touch control organ of this watch.

In other embodiments:

- the antenna circuit and the touch control circuit are located in the bezel on either side of an axis of symmetry passing through the centre of the bezel;
- the bezel comprises first and second portions likely to be assembled with one another;
- the bezel comprises a first portion that is capable of enclosing a crystal of the watch;
- the bezel comprises a second portion that is capable of enclosing a dial of the watch;
- the first portion of the bezel comprises a body comprising an outer face of the bezel provided with at least one touch area;
- the second portion of the bezel comprises a support element provided with an upper surface including at least one relief the tip of which is covered with a conductive material forming an electrode, said tip being located facing a portion of an inner face of the body of the first portion of the bezel arranged below a first or of a second touch area of an outer face of this first portion constituting an external face of the bezel;
- the antenna circuit is produced on an upper surface of a support element or on an inner face of the body of the first portion of the bezel;
- the antenna circuit comprises first and second strands produced on a first portion of the upper surface of a support element of a second portion of the bezel, said first and second strands each having a proximal end and a distal end, and extending in parallel between their proximal and distal ends, the first and second strands being connected by their distal ends as well as at their proximal ends;
- the touch control circuit comprising at least one electrode is produced on a second portion of the upper surface of a support element of a second portion of the bezel;
- the antenna circuit comprises a microcircuit connected to the first and second strands by means of a connection track produced on the upper surface of a support element of a second portion of the bezel;
- the control circuit comprises a microcontroller connected to said at least one electrode by means of at least one connection track;
- the bezel is manufactured in at least one dielectric and/or electrically non-conductive material;
- the watch is a connected watch comprising a bezel that is a bezel forming totally or partially a touch interface.

BRIEF DESCRIPTION OF THE FIGURES

Other features and advantages of the present invention will become more apparent from the following description, made with reference to the appended figures listed below.

DETAILED DESCRIPTION OF THE INVENTION

Figure 1:
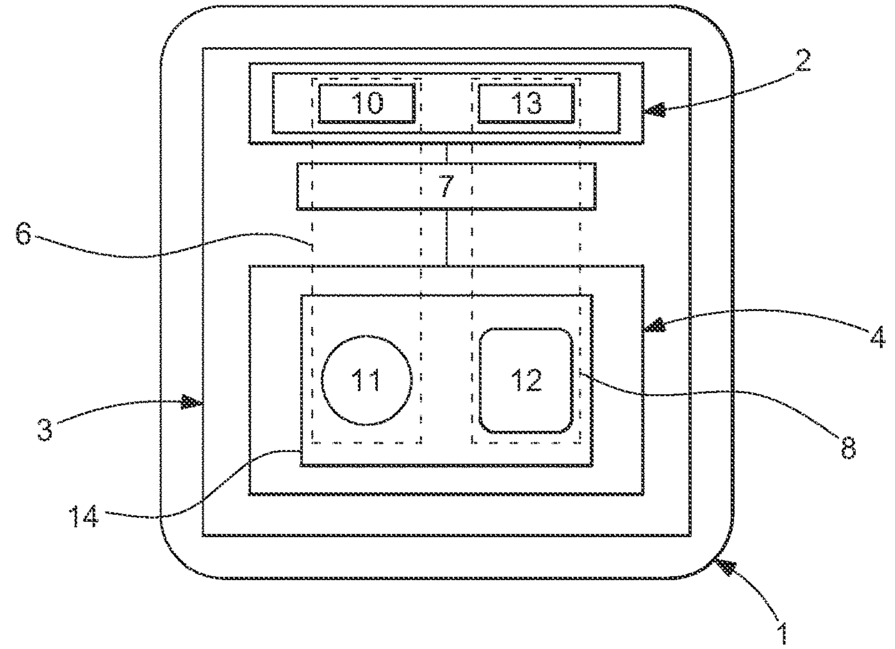
FIG. 1 is a schematic representation of an electronic watch comprising a bezel forming totally or partially a touch interface of said watch, according to one embodiment of the invention.
Figure 2:
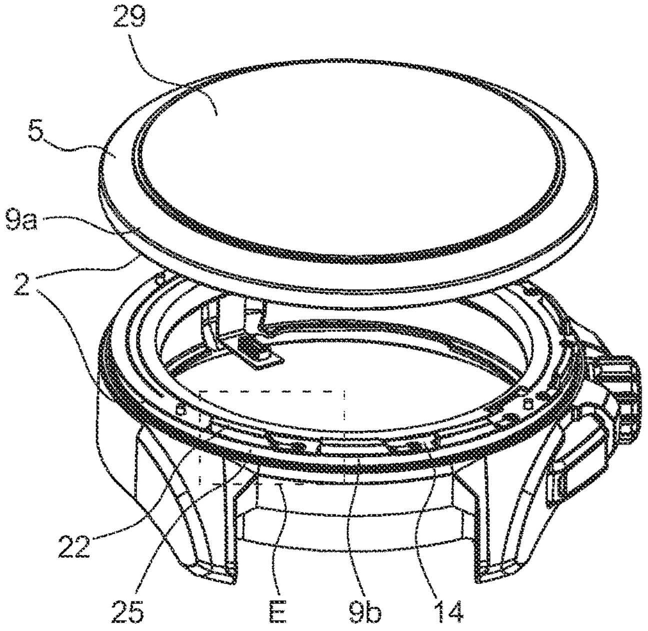
FIG. 2 is a representation of the bezel comprising a second portion a support element of which includes on its upper surface a touch control circuit particularly provided with electrodes, according to the embodiment of the invention.
Figure 3:
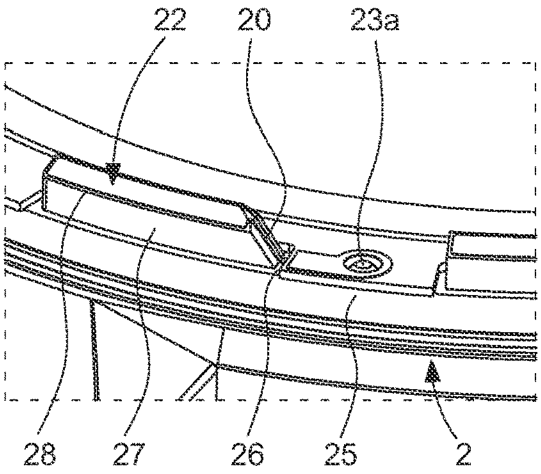
FIG. 3 is a larger scale view of a portion E of FIG. 2, according to the embodiment of the invention.
Figure 4:
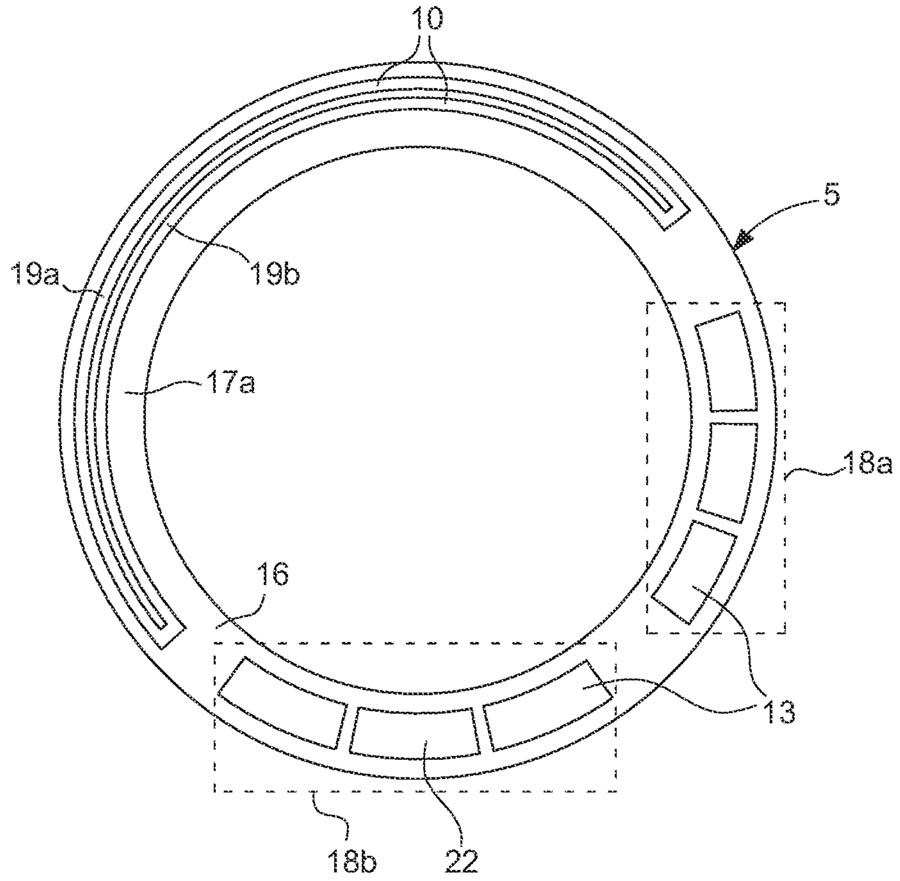
FIG. 4 is a schematic representation of the layout of the electrodes of the touch control circuit and of the antenna circuit of said watch on the upper surface of the support element of the second portion of the bezel participating in forming a flange of this bezel, according to the embodiment of the invention.
Figure 5:
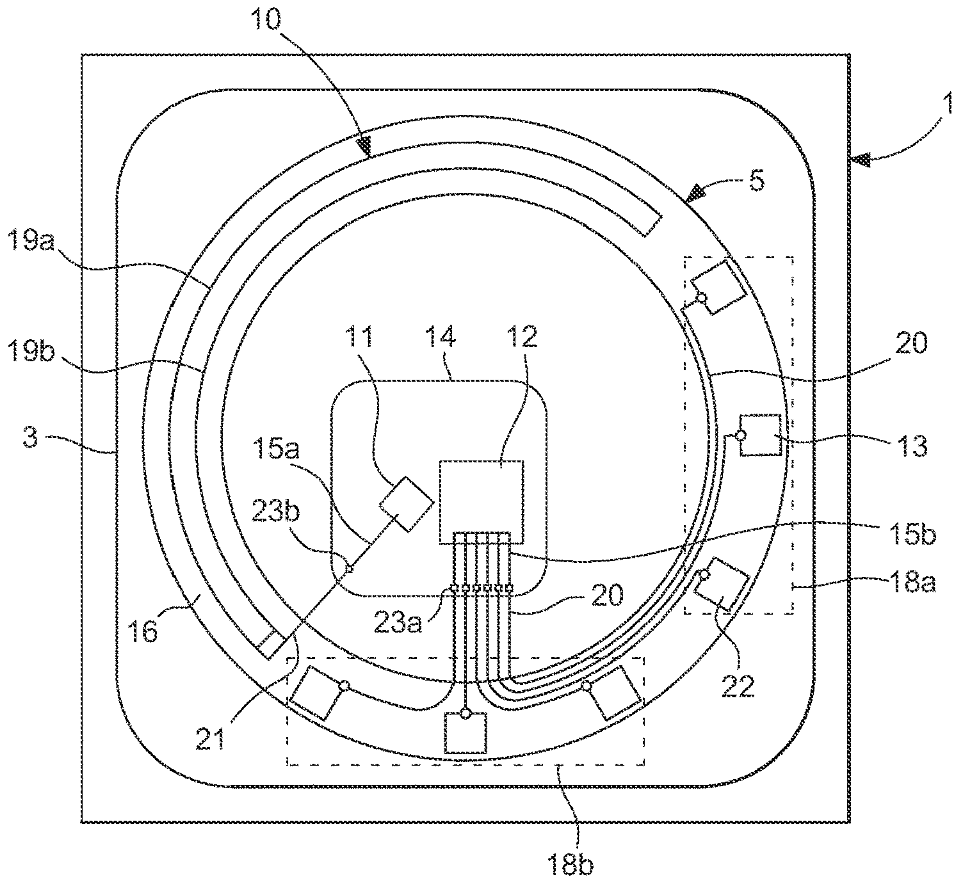
FIG. 5 is a schematic representation of the watch comprising a communication module and a touch control organ of which respectively the antenna circuit and the touch control circuit are arranged on the upper surface of the support element, according to the embodiment of the invention.
Figure 6:
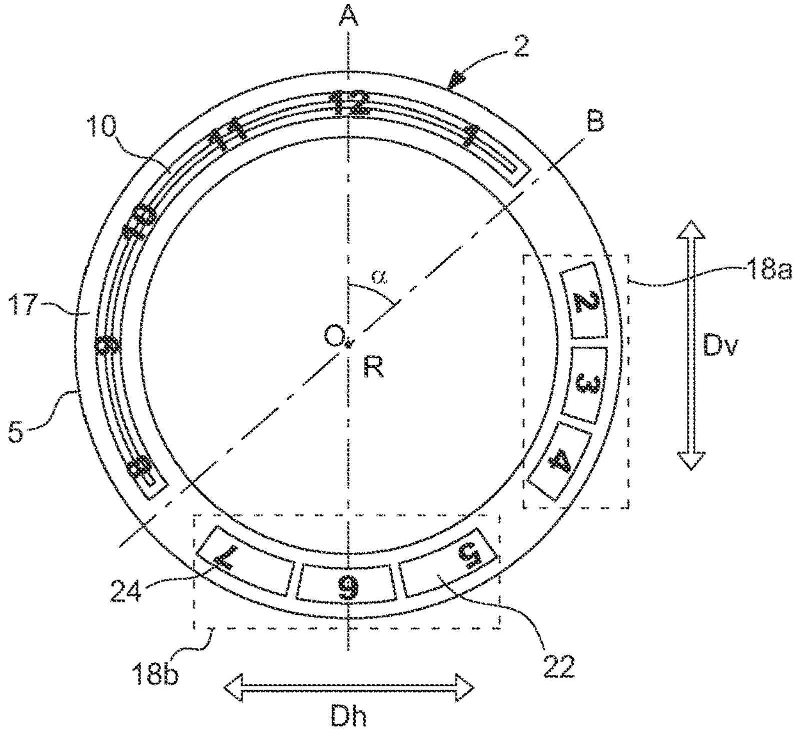
FIG. 6 shows the bezel of the electronic watch transparently revealing the antenna circuit and the touch control circuit, according to the embodiment of the invention.

With reference to FIG. 1, the invention concerns an electronic watch 1 such as a connected watch.

In this context, such an electronic watch 1 is provided with a case 3 including a bezel 2 forming totally or partially a touch interface of said electronic watch 1 by means of which a wearer of this watch 1 may interact with the latter with a view to controlling for example the horological functions of this watch 1. This case 3 also includes a middle that may be made of metal (e.g. steel, preferably stainless), of a synthetic material (e.g. of a composite material comprising a polymer matrix filled with fibres, typically of carbon) or of ceramic or also of at least one dielectric and/or electrically non-conductive material. The case 3 also comprises a back and a crystal 29 that participate in forming with the middle, an enclosure of this case 3.

In such an enclosure, are particularly arranged a dial 7 comprising a display device, and an electronic device 4 of said electronic watch 1. The display device includes display elements that may be analogue such as hands and/or digital such as an LCD, LED or also OLED screen. The display device and the dial 7 are located between the crystal 29 and the electronic device 4.

In this configuration, the bezel 2 comprises first and second portions 9*a*, 9*b* likely to be assembled with one another. In this bezel 2 the first portion 9*a* holds tightly the crystal 29. In other words, this first portion 9*a* is capable of enclosing the crystal 29 of the watch 1 by being in contact with or even by covering a rim of this crystal. Concerning the second portion 9*b*, for its part it is capable of enclosing the dial 7 of this watch 1 by being also here likely to be in contact with or even covering the rim of this dial 7. This bezel 2 also comprises a spacer or flange that is arranged between the crystal 29 and this dial 7. Indeed, this flange is formed by the portion of the bezel 2 that starting from the notch of the crystal 29 covers the rim of the dial. Such a flange is included both in the first and second portions 9*a*, 9*b* of this bezel 2.

In this watch 1, the electronic device 4 comprises an electronic horological movement. It is configured to provide at least one item of information that must be displayed by the display device of the dial 7. This electronic device 4 includes in a non-exhaustive and non-limiting way a communication module 6, a control module of the electronic watch, an electrical energy accumulator particularly a battery as well as various sensors such as for example sensors participating in determining a geolocation, an altitude or a temperature of a location or also in determining physiological, biometric, vital and/or behavioural parameters of the wearer of the electronic watch 1.

It will be noted that in this configuration, the control module makes it possible for the wearer of such an electronic watch 1 to be able to interact with the latter particularly by being able to activate/deactivate/select various functions—for example horological functions—likely to be implemented by this electronic watch 1. This control module comprises a touch control organ 8 and in alternatives other control organs such as push-pieces or buttons arranged on the middle.

In the electronic device 4, the communication module 6 comprises an antenna circuit 10 connected to a microcircuit 11, and the touch control organ 8 comprises a microcontroller 12 connected to a touch control circuit 13. As we will see subsequently, the antenna circuit 10 and the control circuit 13 are arranged on the flange of the bezel 2, the latter forming totally or partially a touch interface of the electronic watch 1.

Such a bezel 2 is preferably arranged on the middle of the case 3. It may be a rotating bezel or a fixed bezel. As we have mentioned above, this bezel 2 is formed by assembling its first and second portions 9*a*, 9*b* with one another. These two portions 9*a* 9*b* are reversibly and/or sealingly linked with one another.

The first portion 9*a* of the bezel 2 comprises a body 5 provided with an inner face and of an outer face 17 that forms an external face 17 of the bezel 2. The external face 17 is a face of this bezel 2 visible by the wearer that may be manipulated particularly at the first and second touch areas 18*a*, 18*b* defined on this face 17. The bezel 2 may comprise on its external face 17 a graduation. In the example illustrated, the graduation comprises figurative indices 24 that are presented in the form of digits (preferably Arabic).

In order that the antenna circuit 10 and the control circuit 13 operate effectively and/or optimally, the body 5 of the first portion 9*a* of this bezel 2 is made of at least one dielectric and/or electrically non-conductive material. Said at least one material makes it possible to contribute to the performance of the capacitive effect of the touch control organ 8. This material also participates in not deteriorating the radiation of the antenna circuit 10, enlarging its electrical length and improving its efficiency in relation to its physical size. Such a material may be for example a polymer, titanium or a ceramic, or any other synthetic material. It will be noted that it is possible that the body 5 of this first portion 9*a* is not entirely produced in this type of material but that only portions of this body 5 comprising first and second touch areas 18*a*, 18*b* of the external face 17 of the bezel 2 are made of this material.

The second portion 9*b* of the bezel 2 comprises a support element 25 provided with an upper surface 26 including at least one relief 27 the tip 28 of which is covered/coated with a layer of a conductive material forming an electrode 22. Such a tip 28 is located facing or even in contact with a portion of the inner face of the first portion 9*a* of the bezel 2 arranged below the first or of the second touch area 18*a*, 18*b* of the outer face 17 of this first portion 9*a* constituting the external face 17 of the bezel 2.

In this configuration, the support element 25 is a thermoplastic part. More specifically, this support element 25 is a part injection moulded from a Moulded Interconnect Device (MID) technology, comprising on its upper surface 26 at least one electrode 22. It will be noted that such a support element 25 distinguishes from conventional substrate materials by better mechanical, chemical, electrical and environmental properties.

Alternatively, this support element 25 may be a substrate comprising an upper surface 26 provided with at least one relief 27 the tip 28 of which is covered/coated with the layer of a conductive material and this, from a physical vapour deposition technology of a conductive material or from a selective printing technology on a micrometric scale of this conductive material. Silkscreen technologies by silver on a polyester substrate or by copper on a polyimide substrate is also possible.

The support element 25 of this second portion 9*b* of this bezel 2 may comprise arrangements aiming to provide access to a printed circuit 14 of the electronic device 4 including the microcontroller 12 of the control organ 8 and the microcircuit 11 of the communication module 6. Such arrangements thus offer the possibility of constituting a passage or of defining a location in this support element 25 in order to facilitate the connection of the control circuit 13, in particular of the electrodes 22, and of the antenna circuit 10 respectively to the microcontroller 12 of the control organ 8 and to the microcircuit 11 of the communication module 6.

With reference to FIGS. 2 to 5, the control organ 8 comprises the microcontroller 12 that is connected to the touch control circuit 13. As we have mentioned, such a touch control circuit 13 comprises at least one conductive material layer included on the tip 28 of a relief 27 forming an electrode 22, the relief 27 being located under one of the first and second touch areas 18*a*, 18*b* of the outer face 17 of the body 5 of the first portion 9*a* of the bezel 2. In other words, each electrode 22 is formed by the conductive material layer or is in the form of such a layer. Such an electrode 22 has a circular or parallelepiped or even triangular shape.

This electrode 22 is connected to a connection terminal 23*a* defined on the printed circuit 14 of the electronic device 4, this terminal 23*a* being linked/connected to the microcontroller 12 of the control organ 8. In this configuration, the control circuit 13 comprises an electrical connection element 20 likely to perform the connection between each electrode 22 and the microcontroller 12. This connection element 20 is capable of cooperating with at least one electrical track 15*b* of the printed circuit 14 of the electronic device 4 comprising the microcontroller 12. In this way, each electrode 22 is thus connected to the microcontroller 12 from this connection element 20 and from said at least one electrical track 15*b*. Finally, it will be noted that the touch control circuit 13 preferably comprises as many connection elements 20 as the support element 25 comprises electrodes 22.

With reference to FIGS. 2 and 4 to 6, the touch control organ 8 comprises six electrodes 22 distributed on the upper surface 26 of the support element 25. More specifically, these electrodes 22 are included on this surface 26 in such a way as to define/form the two distinct touch areas 18*a*, 18*b* on the external face 17 of this bezel 2, these two touch areas 18*a*, 18*b* thus forming the touch interface of the electronic watch 1. In this configuration, the upper surface 26 of the support element 25 comprises a plurality of electrodes 22 for each touch area 18*a*, 18*b*. The first touch area 18*a* comprises three electrodes 22 arranged respectively under the indices 24 two, three and four defined on the external face 17 of the bezel 2. The second touch area 18*b* also comprises three electrodes 22 arranged respectively under the indices 24 five, six and seven defined on this external face 17 of the bezel 2.

In this configuration, the first touch area 18*a* makes it possible for the wearer of the watch 1 to interact with the latter by carrying out a movement in particular a "vertical movement" (referenced Dv on FIG. 6) of an accessory such as a stylus or also of one end of one of their limbs such as a finger on this first area 18*a*. Concerning the second touch area 18*b*, it makes it possible for the wearer of the watch 1 to interact with the latter by carrying out a movement in particular a "horizontal movement" (referenced Dh on FIG. 6) of such an accessory or also of the end of one of their limbs on this area 18*b*. The vertical movement describes a trajectory that is substantially parallel or parallel to an axis of symmetry A of the bezel 2 passing through the centre O of this bezel 2 and this trajectory also being substantially perpendicular or perpendicular to an axis of revolution R of this bezel 2. Concerning the horizontal movement, it describes a trajectory that is for its part substantially perpendicular or perpendicular to this axis A (or to the trajectory described by the vertical movement) and also to the axis of revolution R of this bezel 2. Such an axis A separates the bezel 2 into two equal portions by linking the indices 24 twelve and six present on the outer face 17 of this bezel 2.

In the electronic device 4, the communication module 6 is capable of making it possible to connect the electronic watch 1 to a Bluetooth-type communication network. In other words, the communication module 6 is configured to communicate according to a Bluetooth-type protocol. Alternatively, this communication module 6 may be capable of making it possible to connect the watch 1 to a Geolocation and Navigation Satellite System (GNSS), such as for example the Global Positioning System (GPS), Glonass or Galileo. This communication module 6 comprises the antenna circuit 10 connected to the microcircuit 11.

In the present embodiment, such an antenna circuit 10 is included on the upper surface 26 of the support element 25 of the bezel 2. This antenna circuit 10 comprises first and second strands 19*a*, 19*b* each having a proximal end and a distal end, and extending in parallel between their proximal and distal ends. In this antenna circuit 10, the architecture with two strands in parallel makes it possible to broaden the frequency band (100 MHz), necessary for example to communicate on a Bluetooth-type communication network (2.4 GHz). In this antenna circuit 10, the first and second strands 19*a*, 19*b* are connected at their distal ends as well as at their proximal ends.

In this configuration, the antenna circuit 10 essentially extends according to an arc-of-circle trajectory by including two strands 19*a*, 19*b* arranged in parallel on the upper surface 26 that follows this trajectory. This antenna circuit 10 also comprises an electrical connection element 21 linked to a connection terminal 23*b* defined on the printed circuit 14 of the electronic device 4, this terminal 23*b* being connected to the proximal or distal ends of the strands 19*a*, 19*b*. This electrical connection element 21 is capable of cooperating with at least one electrical track 15*a* of the printed circuit 14 of the electronic device 4 comprising the microcircuit 11 of the communication module 6. In this way, the antenna circuit 10 is connected to this microcircuit 11 from this said electrical connection element 21 and from said at least one electrical track 15*a*.

In this watch 1, the antenna circuit 10 and the touch control circuit 13 are located in the bezel 2 on either side of an axis of symmetry B passing through the centre O of the bezel 2 and that is substantially perpendicular or perpendicular to the axis of revolution R of this bezel 2. This axis referenced B separates the bezel 2 or its first and second portions 9*a*, 9*b*, or the upper surface 26 into two portions and forms an angle α with the axis A that is between 30 and 40 degrees and that is preferably of 36 degrees. Thus, the antenna circuit 10 and the touch control circuit 13 are totally or partially produced on distinct portions of the surface 26 of the support element 25 or of the bezel 2 or of the first and second portions 9*a*, 9*b*.

These two portions are separated by the axis of symmetry B. More specifically, the upper surface 26 of the support element 25 of the second portion 9*a* of the bezel 2 therefore comprises two portions. The first portion comprises a relief the tip of which includes the first and second strands 19*a*, 19*b* of this antenna circuit 10. The second portion comprises for its part the reliefs 27 forming the electrodes 22.

It will further be noted that the support element 25 comprising both the control circuit 13 and the antenna circuit 10 may be produced from the technology referred to as MID already mentioned. When the support element 25 is a substrate provided with reliefs, the antenna circuit and the touch control circuit may be produced from the physical vapour deposition technology of a conductive material or from the selective printing technology on a micrometric scale of this conductive material. Silkscreen technologies by silver on a polyester upper surface 26 or by copper on a polyimide upper surface 26 is also possible.

Furthermore, it will be noted that in one variant, the touch control circuit 13 is included on the support element 25 of the second portion 9*b* of the bezel 2 and the antenna circuit on the inner face of the bezel 2. The production of this antenna circuit 10 on this inner face may be carried out from the physical vapour deposition technology of a conductive material or from the selective printing technology on a micrometric scale of this conductive material comprising a conductive ink, mentioned above.

It goes without saying that the present invention is not limited to the embodiment that has just been described, and that miscellaneous modifications and simple variants may be envisaged by the person skilled in the art without departing from the scope of the invention as defined by the appended claims.

The invention claimed is:

1. An electronic watch (1) comprising a case provided with a bezel (2) forming totally or partially a touch interface of said watch (1), said bezel (2) comprising an antenna circuit (10) of a communication module (6) of the watch (1) and a flange provided with a touch control circuit (13) of a touch control organ (8) of this watch (1), wherein the bezel (2) comprises a first member (9*a*), that contacts and encloses a crystal (29) of the watch, and a second member (9*b*), the first member (9*a*) and the second member (9*b*) being assembled to each other with the antenna circuit (10) and the touch control circuit (13) arranged on the second member (9*b*) and facing an inside of the first member (9*a*), wherein the antenna circuit (10) and the touch control circuit (13) are arranged on a face of the second member (9*b*) and the face of the second member (9*b*) is covered by the first member (9*a*), and wherein the face of the second member (9*b*) comprises a relief (27) protruded towards the first member (9*b*) from an upper surface (26) of the second member (9*b*), the touch control circuit (13) comprises an electrode (22) and a connection terminal (23*a*), and a tip (28) of the relief (27) is a most protruded portion of the relief (27) from the upper surface (26) and comprises the electrode (22) of the touch control circuit (13) thereon the tip (28) of the relief (27).

2. The electronic watch (1) according to claim 1, wherein the antenna circuit (10) and the touch control circuit (13) are located in the bezel (2) on either side of an axis of symmetry (B) passing through the centre (O) of the bezel (2).

3. The electronic watch (1) according to claim 1, wherein the first member (9*a*) comprises a body (5) comprising an outer face (17) of the bezel (2) provided with at least one touch area (18*a*, 18*b*).

4. The electronic watch (1) according to claim 1, wherein the second member (9*b*) includes a support element (25) provided with the upper surface (26), and the tip (28) is covered with a conductive material forming the electrode (22), said tip (28) being located facing a portion of an inner face of a body (5) of the first member (9*a*) of the bezel (2) arranged below a first or a second touch area (18*a*, 18*b*) of an outer face (17) of the first member (9*a*) constituting an external face of the bezel (2).

5. The electronic watch (1) according to claim 1, wherein the antenna circuit (10) is produced on the upper surface (26) of a support element (25) or on an inner face of a body (5) of the first member (9*a*) of the bezel (2).

6. The electronic watch (1) according to claim 5, wherein the antenna circuit (10) comprises first and second strands (19*a*, 19*b*) produced on a first portion of the upper surface (26) of the support element (25) of the second member (9*a*) of the bezel (2), said first and second strands (19*a*, 19*b*) each having a proximal end and a distal end, and extending in parallel between their proximal and distal ends, the first and second strands (19*a*, 19*b*) being connected by their distal ends as well as at their proximal ends.

7. The electronic watch (1) according to claim 1, wherein the touch control circuit (13) comprises at least one electrode (22) that is produced on a second portion of the upper surface (26) of a support element (25) of the second member (9*a*) of the bezel (2).

8. The electronic watch (1) according to claim 7, wherein the control circuit (13) comprises a microcontroller (12) connected to said at least one electrode (22) by means of at least one connection track (20).

9. The electronic watch (1) according to claim 1, wherein the bezel (2) is manufactured in at least one dielectric and/or electrically non-conductive material.

10. The electronic watch (1) according to claim 1, wherein the upper surface (26) of the second member (9*b*) comprises the connection terminal (23*a*) thereon, and the electrode (22) at the tip (28) of the relief (27) is electrically connected to the connection terminal (23*a*) by a connection element (20) extended along an outside of the relief (27) from the tip (28) to the connection terminal (23*a*).

11. An electronic watch (1) comprising a case provided with a bezel (2) forming totally or partially a touch interface of said watch (1), said bezel (2) comprising an antenna circuit (10) of a communication module (6) of the watch (1) and a flange provided with a touch control circuit (13) of a touch control organ (8) of this watch (1), wherein the antenna circuit (10) comprises a microcircuit (11) connected to first and second strands (19*a*, 19*b*) by means of a connection track (21) produced on an upper surface (26) of a support element (25) of a first portion (9*a*) of the bezel (2), wherein the antenna circuit (10) and the touch control circuit (13) are arranged on a face of a second member (9*b*) and the face of the second member (9*b*) is covered by the first portion (9*a*), and wherein the face of the second member (9*b*) comprises a relief (27) protruded towards the first portion (9*b*) from the upper surface (26), the touch control circuit (13)

comprises an electrode (22) and a connection terminal (23*a*), and a tip (28) of the relief (27) is a most protruded portion of the relief (27) from the upper surface (26) and comprises the electrode (22) of the touch control circuit (13) thereon the tip (28) of the relief (27).

12. The electronic watch according to claim 11, wherein the upper surface (26) of the second member (9*b*) comprises the connection terminal (23*a*) thereon, and the electrode (22) at the tip (28) of the relief (27) is electrically connected to the connection terminal (23*a*) by a connection element (20) extended along an outside of the relief (27) from the tip (28) to the connection terminal (23*a*).

* * * * *